United States Patent [19]

DeSalve

[11] Patent Number: 5,484,122
[45] Date of Patent: Jan. 16, 1996

[54] TURBINE EXHAUST GAS ANTI-ICE SYSTEM

[75] Inventor: Dennis W. DeSalve, Findlay, Ohio

[73] Assignee: Parker-Hannifin Corporation, Cleveland, Ohio

[21] Appl. No.: 149,588

[22] Filed: Nov. 9, 1993

[51] Int. Cl.⁶ ................................................. B64D 15/00
[52] U.S. Cl. ................................ 244/134 B; 244/117 A; 60/39.093
[58] Field of Search .......................... 244/134 R, 134 B, 244/117 A; 60/39.093

[56] References Cited

U.S. PATENT DOCUMENTS

| 2,514,105 | 7/1950 | Thomas | 244/134 R |
| 2,556,736 | 6/1951 | Palmatier | 244/134 R |
| 2,563,054 | 8/1951 | Messinger et al. | 244/134 R |
| 2,645,435 | 7/1953 | Pouit | 244/134 R |
| 2,648,193 | 8/1953 | Redding | 60/39.093 |
| 2,868,483 | 1/1959 | Krueger | 244/134 R |
| 3,143,854 | 8/1964 | Ward | 244/134 R |
| 3,933,327 | 1/1976 | Cook et al. | 244/134 R |
| 4,482,114 | 11/1984 | Gupta et al. | 244/134 B |
| 4,561,245 | 12/1985 | Ball | 69/39.093 |
| 4,674,714 | 1/1987 | Cole et al. | 244/134 R |
| 4,739,823 | 4/1988 | Howard | 244/117 A |
| 4,747,543 | 5/1988 | Madden | 244/117 A |
| 4,783,026 | 11/1988 | Rumford et al. | 244/134 R |
| 5,011,098 | 4/1991 | McLaren et al. | 244/134 R |
| 5,149,018 | 9/1992 | Clark | 244/117 A |

FOREIGN PATENT DOCUMENTS

| 436243 | 7/1991 | European Pat. Off. | 244/134 B |
| 871408 | 4/1941 | France | 244/134 B |

OTHER PUBLICATIONS

Illustration #1 heat Exchanger for Grumman F–14.
Illustration #2 Air to Oil heat Exchanger for Boeing 727 Aircraft.
Illustration #3 Air to Air heat exchanger for Huey Helicopter.
Illustration #4 Air to air heat exchanger (stainless steel) for Huey Helicopter.
Illustration #5 Air to oil Heat exchanger for Boeing 747 Aircraft.
Illustration #6 Air to Oil heat exchanger for Boeing 747 Aircraft.

Primary Examiner—Andres Kashnikow
Assistant Examiner—Virna Lissi Mojica
Attorney, Agent, or Firm—Christopher H. Hunter

[57] ABSTRACT

A system for removing and/or preventing ice build-up on an aircraft includes at least one heat exchanger mounted within an aperture in the tailpipe of a gas turbine engine. The heat exchanger includes an inner plate having a surface which faces inwardly into the tailpipe and which is in direct contact with the heated exhaust gas in the tailpipe, and an outer plate with a surface facing outwardly from the tailpipe and in direct contact with a cooler air stream passing around the turbine engine core. A series of heat exchange fins are formed on the inner plate to direct exhaust gas across the inner plate, and a series of heat exchange fins are formed on the outer plate to direct the cooler air across the outer plate. Heat transfer fluid flows between the inner plate and the outer plate and absorbs heat energy from the exhaust gas. The heat transfer fluid flows through a filter, accumulator and pump system to heat transfer structure integral with the exposed portions of the aircraft. The heat transfer fluid transfers heat energy to the exposed portions of the aircraft to reduce and prevent ice build-up on the aircraft. When the system is not active, excess heat energy is transferred from the heat exchange fins on the outer plate to the cooler air flow to prevent vaporization or boiling of the heat transfer fluid.

24 Claims, 2 Drawing Sheets

TURBINE EXHAUST GAS ANTI-ICE SYSTEM

BACKGROUND OF THE INVENTION

1. Field of the Invention

The present invention relates generally to a system and apparatus for preventing and removing ice build-up on an aircraft, and more particularly to a heat exchanger which utilizes the heat energy from the exhaust gas in the turbine engine to deice exposed portions of an aircraft.

2. Previous Methods

Certain techniques for preventing and removing ice from exposed, air flow surface portions of an aircraft are known. One technique utilizes hot, compressed air from the discharge region of the engine compressor called "bleed air." A portion of the total engine bleed air available is routed to the various exposed aircraft portions which are subjected to icing, and then exhausted overboard. Such a technique is shown in Rumford, et al., U.S. Pat. No. 4,783,026; McLaren, et al., U.S. Pat. No. 5,011,098; Cole, et al., U.S. Pat. No. 4,674,714; Thomas, U.S. Pat. No. 2,514,105; Palmatier, U.S. Pat. No. 2,556,736; Cook, et al., U.S. Pat. No. 3,993,327; Pouit, U.S. Pat. No. 2,645,435; Krueger, U.S. Pat. No. 2,868,483; and Messinger, et al., U.S. Pat. No. 2,563,054.

Another known technique uses electrical resistive elements formed integrally with the exposed portions of the aircraft. The electrical resistive elements are electrically connected to onboard generators and heat the exposed portions of the aircraft.

Another technique utilizes bladders or other mechanical structure on the exposed portions of the aircraft. The bladders are driven by pneumatic pumps and are designed to mechanically deform to shed ice build-up. A still further technique utilizes chemicals stored on board which are applied as necessary to the exposed portions of the aircraft to remove and/or prevent ice build-up.

While these known techniques can be useful in preventing and/or removing ice on the exposed portions of the aircraft, these techniques are not without drawbacks.

For example, the compressor bleed air technique described above can impair the performance of the engine, and hence increase fuel consumption. Fuel consumption has become an important consideration in aircraft design. Electrical resistive techniques can require electrically complex systems. Additionally, the electrical and mechanical techniques can also tax the engines to drive the necessary equipment, such as generators or pneumatic pumps. Finally, the chemical techniques can increase the overall weight of the aircraft, thus also increasing fuel consumption.

It is known that heat transfer fluid has been used to transfer heat energy away from a location on an aircraft. For example, it is known to provide a pair of plates sealed together around the edges to form a plenum, and to dispose heat transfer fluid within the plenum. The inner of the two plates is then located in contact with an exterior wall portion of the aircraft, such as against the surface of the turbine engine, and heat energy is bled away from the engine to prevent over-heating of engine components and accessories (e.g., gear systems, drive generators, etc). It is believed this technique would not be useful in transferring heat energy to an exposed portion of an aircraft to de-ice the aircraft because: (i) this technique would require a large number of heat transfer devices to draw enough heat energy from the walls of the engine so as to be useful; and (ii) even if one of the plates was located within (in direct contact with) the exhaust gas stream of the engine, the plate would degrade rapidly because it is not formed from a material which could withstand prolonged contact with the exhaust gas, and the heat transfer fluid would have to be continuously moved between the plates so as to prevent boiling or vaporization of the fluid, thus always burdening the engines even when it is not necessary to de-ice the aircraft.

Hence, there is a demand in the industry for a simple and effective system for preventing and removing ice on exposed portions of aircraft, and in particular for a system which does not significantly burden or tax the aircraft engines and, therefore, does not negatively impact the specific fuel consumption of the engines.

SUMMARY OF THE INVENTION

The present invention provides a novel and unique system and apparatus for removing and/or preventing ice build up on exposed portions of an aircraft. The invention uses the heat energy from the exhaust gas stream of the turbine engine to heat the exposed portions of the aircraft. The invention efficiently removes and prevents ice build-up on the exposed portions of an aircraft and does not significantly tax or burden the aircraft engine. Moreover, the invention uses a system which is relatively simple and easy to operate and maintain.

The invention includes the use of a heat exchange system which comprises at least one heat exchanger preferably mounted within an aperture are formed in the tailpipe of the turbine engine. The heat exchanger includes an inner plate having a surface which faces inwardly into the tailpipe and which is in thermal contact with the heated exhaust gas stream in the tailpipe, and an outer plate with a surface facing outwardly from the tailpipe and in thermal contact with a cooler air stream passing about the turbine engine core. Heat transfer fluid flows between the inner plate and the outer plate and absorbs heat energy from the exhaust gas. A series of heat exchange fins are formed on the inner plate so as to provide sufficient surface area across the inner plate for efficient heat transfer from the exhaust gas. The outer plate also includes a plurality of fins which provides sufficient surface area across the outer plate to draw excess heat energy away from the heat transfer fluid and transfer the heat energy to the cooler air flow when necessary to prevent vaporization or boiling of the fluid.

The heat transfer fluid flows from the heat exchanger through fluid conduits to a filter, accumulator and pump system. The filter, accumulator and pump system filters the heat transfer fluid, stores excess fluid, and maintains a predetermined fluid pressure within the system. The heat transfer fluid then flows through heat transfer structure formed integral with the exposed portions of the aircraft. The heat transfer fluid in the heat transfer structure transfers heat energy to the exposed portions of the aircraft to reduce and/or prevent ice build-up on the aircraft. The heat transfer fluid then returns to the heat exchangers to again absorb heat energy from the exhaust gas. The present invention can use conventional types of accumulators, pumps and filters, as well as conventional heat transfer structure integral with the exposed portions of the aircraft so as to maximize compatibility with previously installed systems and minimize start-up or change-over costs. Moreover, the use of heat transfer fluid rather than compressed air provides a thermally more efficient system which reduces the number of fluid control devices necessary for heat transfer control and hence decreases the complexity, maintenance and overall cost of the system.

The present invention therefore provides a technique which efficiently de-ices an aircraft using a heat exchange system which does not substantially tax or burden the aircraft engine, and hence does not negatively impact the specific fuel consumption of the engine.

DETAILED DESCRIPTION OF THE PREFERRED EMBODIMENTS

Figure 1:
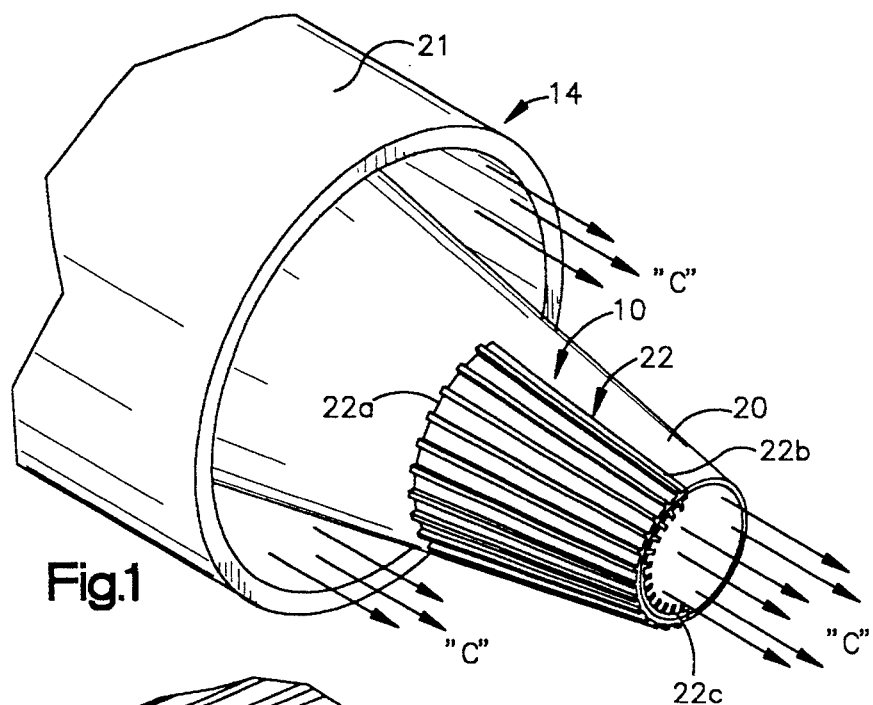
FIG. 1 is a schematic perspective view of an engine turbine with a heat exchanger constructed according to the principles of the present invention.
Figure 2:
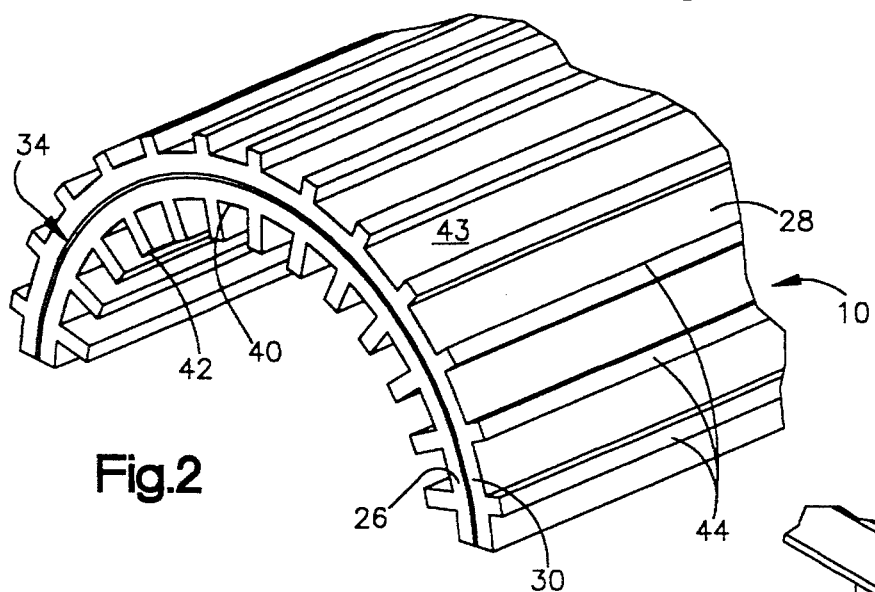
FIG. 2 is a cross-sectional end view of the heat exchanger of FIG. 1.

Referring to the drawings, and initially to FIGS. 1 and 2, a heat exchanger constructed according to the present invention is indicated generally at 10. The heat exchanger is incorporated into a system for drawing heat energy from the exhaust gas from a gas turbine engine, indicated generally at 14, to de-ice or anti-ice exposed portions of an aircraft, e.g., the engine inlet cowls and nacelles, the wing leading edges and slats, the elevator, rudder, stabilizers and aileron, or other appropriate portions of the aircraft. A gas turbine engine typically includes a frustroconical or cylindrical tailpipe 20 extending outwardly from a compressor, combustion chamber and turbine (not shown), all of which are at least partially enclosed by an engine cowl 21. The heated turbine exhaust gas "G" discharges from the tailpipe in the form of reactive propulsive jets in the well-known manner. Further, a cooler, fan-induced air flow stream "C" is discharged from the annular space located between the engine core and the engine cowl to provide greater propulsion force. The details of the turbine engine are omitted from this description and drawings for sake of brevity and, in any case, are known by those of ordinary skill in the art.

The heat exchanger 10 of the present invention can be used in any conventional gas turbine engine for airplanes, helicopters, etc, as should be apparent to those of ordinary skill in the an upon reading the following specification. Further, although only a single heat exchanger is illustrated in the drawings, it is anticipated that multiple heat exchangers would be used on the aircraft, for example, one heat exchanger on each turbine engine of the aircraft (assuming that the aircraft has multiple engines), or that two or more heat exchangers circumferentially arranged on the tailpipe could be used with each engine. The number and location of the heat exchangers will depend upon the heat transfer requirements of the aircraft, as well as the particular aircraft structure, however as will be described herein in more detail, the present invention minimizes the number of heat exchange and fluid control devices necessary to absorb heat energy for transfer to the exposed portions of the aircraft.

The heat exchanger 10 is preferably mounted within an aperture or opening 22 formed in the sidewall of the engine tailpipe 20. The aperture 22 extends completely through the wall of the tailpipe and includes edges 22a, 22b and 22c, which define an opening of approximately the same size and shape as the heat exchanger 10. The heat exchanger 10 extends across and covers the entire aperture and is mounted to the surrounding tailpipe wall using conventional types of fasteners (e.g., bolts, rivets, welding, etc.). Further, if necessary, flanges and/or mounting brackets (not shown) can be used to securely attach the heat exchanger to the surrounding tailpipe.

The heat exchanger 10 includes an inner plate 26 and an outer plate 28 which together form a housing or receptacle through which heat transfer fluid flows. As shown in FIG. 1, the heat exchanger has the configuration of a segment of the frustroconical tailpipe. The inner and outer plates 26, 28 preferably have the same surface configuration as the tailpipe 20 so as to be substantially flush therewith and prevent aerodynamic drag or other disturbances to the exhaust gas flow stream. The heat exchanger could also have other configurations, such as a full or partial collar or ring around the tailpipe, particularly if the tailpipe is cylindrical. In the preferred embodiment, the heat exchanger 10 extends through a circumferential extent of less than 180° and has an axial length of at least 50% greater than its circumferential dimension. In general, the heat exchanger is formed to match a segment or portion of the tailpipe so that the heat exchanger in essence forms a part of the tailpipe sidewall.

Again, if multiple heat exchangers are to be utilized, each heat exchanger could be mounted in a separate aperture spaced around the periphery of the tailpipe. For example, a second heat exchanger (not shown in FIG. 1 but illustrated in FIG. 4) identical to the heat exchanger 10 can be disposed in the same manner as the heat exchanger 10 in an aperture (not shown) in the tailpipe 20 diametrically opposite the heat exchanger 10. Alternatively, each heat exchanger could be mounted within the same aperture in adjacent relation to each other.

Still further, the heat exchanger (or one of its component plates) can be formed integrally with the tailpipe such as during manufacturing of the tailpipe, in which case the heat exchanger would comprise a predetermined portion of the tailpipe. If the heat exchanger is formed integrally with the tailpipe (rather than being mounted within an aperture), either the inner plate or outer plate can be formed in one piece with the tailpipe sidewall, and the remaining plate can be secured (brazed, welded, etc.) to the first plate to form a plenum for the heat transfer fluid. The above modifications to the heat exchanger and/or the tailpipe will be readily apparent to those skilled in the art upon reading the specification and understanding the principles of the present invention.

In any case, the plates 26, 28 of the heat exchanger are preferably formed from a material which is capable of withstanding the hot exhaust gas within the tailpipe of a turbine engine so as not to be degraded thereby over time. Preferably this material is either Inconel 600 or 625 alloys. The inner and outer plates extend proximate each other in substantially parallel, curved relation (depending upon the configuration of the tailpipe), and are sealed together (e.g., brazed, welded, etc.) around the periphery to form a plenum, indicated generally at 34, through which the heat transfer fluid flows.

The inner plate 26 of the heat exchanger has an outer surface 40 which is in direct thermal contact with the exhaust gas stream in the tailpipe when the heat exchanger is mounted to the turbine engine. The inner plate includes a plurality of fins or vanes 42 formed in one piece with the outer surface and extending radially inwardly into the interior of the tailpipe. The fins 42 each have generally flat, parallel sidewalls 42a which terminate at a flat endwall 42b, and are located at equal spaced-apart intervals circumferentially around the heat exchanger, or in other words, extending along the longitudinal axis of the tailpipe. As illustrated, the fins taper inwardly slightly toward the distal end of the tailpipe (see FIG. 1), however the fins could also taper more sharply inwardly to form V-shaped channels along the inner plate. Alternatively, if the tailpipe is cylindrical rather than frustroconical, the fins can extend in parallel, spaced-apart relation to each other along the length of the tailpipe. In essence, the fins are configured so as to extend in the direction of exhaust gas flow through the tailpipe. The fins direct the exhaust gas stream along the surface 40 of the heat exchanger and provide an increased surface area which maximizes heat transfer with the exhaust gas as the gas exits the tailpipe.

The outer plate 30 likewise includes a plurality of vanes or fins 44 spaced equally across the outer surface 43. The fins 44 on the outer plate are formed in the same manner as the fins on the inner plate and have flat, generally parallel sidewalls 44a which terminate in a flat endwall 44b. The outer fins 44 preferably extend longitudinally along the heat exchanger in the direction of the cooler air flow stream across the outer surface of the tailpipe 20, or in other words, also along the longitudinal axis of the tailpipe. The outer fins 44 also form channels to direct the cool air stream passing through the cowl annulus across the surface of the outer plate.

The fins 42 on the inner plate 26 preferably extend radially outward a greater distance from the inner plate than the fins 44 on the outer plate 30. Thus, there is a greater outwardly-facing surface area for heat transfer and flow control across the inner plate 26 than for the outer plate 30. In other words, heat energy will more readily transfer from the exhaust gas to the heat transfer fluid via the inner plate than from the heat transfer fluid to the cooler air flow stream via the outer plate. The reason for this is two-fold. First, as will be described herein in more detail, the inner plate will absorb more heat energy from the exhaust gas than will be lost via the outer plate to the cooler air flowing through the turbine engine so that heat energy can be transferred to exposed portions of the aircraft. Secondly, when the heat transfer fluid is stagnant (i.e., the system is inactive), the excess heat energy in the heat transfer fluid will be transferred through the outer plate to the cooler air to prevent boiling or evaporation of the fluid. Alternatively, to achieve the same effect, the inner plate 26 could be formed from a material which has greater thermal conductivity than the material forming the outer plate such that heat will transfer more rapidly through the inner plate than the outer plate. In this case, the fins on the outer plate could even extend outwardly the same radial distance as the fins on the inner plate while still achieving greater heat transfer through the inner plate than the outer plate. Preferably, the coefficient of heat conductivity of the material for each plate multiplied by the outwardly facing surface area of the plate is substantially greater (preferably at least 20% greater) for the inner plate 26 than for the outer plate 28.

The heat transfer fluid 34 flows between the inner surface of the inner plate 26 and the inner surface of the outer plate 30 and provides heat transfer therebetween. The heat transfer fluid 34 is preferably an incompressible fluid such as DOW Therm G available from the DOW Chemical Corporation, or other fluid having similar properties which efficiently absorbs heat and has a relatively high boiling or vaporization point. Because of the density and high specific heat of the heat transfer fluid, only a relatively small volume of fluid is necessary for efficient heat transfer, as compared with systems using compressed (bleed) air. Moreover, the incompressible heat transfer fluid is thermally more efficient in transferring heat energy, thus requiring smaller fluid ducts and lower flow rates to transfer the heat energy.

Figure 3:
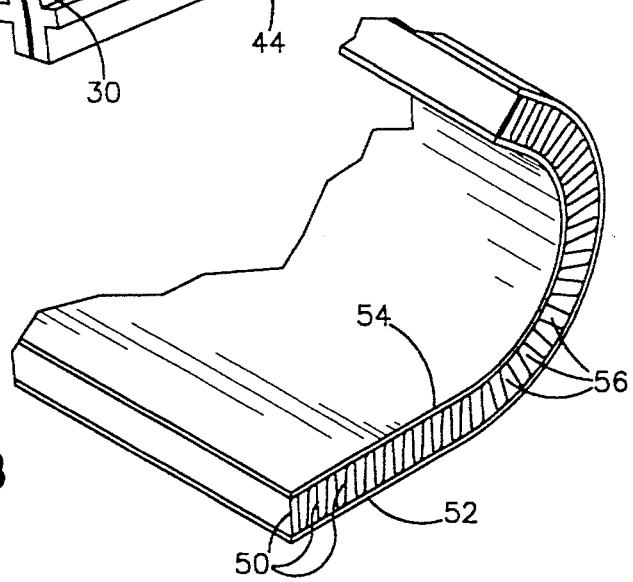
FIG. 3 is a cross-sectional end view of heat transfer structure located within the exposed portion of the aircraft.

The heat exchange system further includes heat transfer structure formed integrally with the exposed portions of the aircraft as illustrated in FIG. 3. The heat transfer structure preferably comprises a honey-comb (or undulating) type structure 50 extending between the outer sheet or wall 52 of the aircraft, and an inner sheet or wall 54. The honey-comb type structure is preferably formed from light-weight aluminum brazed or welded to the inner and outer walls to form a series of longitudinal unobstructed channels or passages 56. The heat transfer fluid flows through the channels 56 of the honey comb structure and transfers heat energy to the exposed portion of the aircraft. The honey-comb structure provides increased heat transfer surface area with the exposed portions of the aircraft for rapid and efficient heat transfer. For a more detailed discussion of this general type of heat transfer structure, the reader is referred to Pouit, U.S. Pat. No. 2,645,435. Other heat transfer structure can also be used in the present invention at the exposed portion of the aircraft to be de-iced, for example as shown in Cook, et al., U.S. Pat. No. 3,933,327; Palmatier, U.S. Pat. No. 2,556,736; Thomas, U.S. Pat. No. 2,514,105; Cole, et al., U.S. Pat. No. 4,674,714; McLaren, et al., U.S. Pat. No. 5,011,098 and Rumford, et al., U.S. Pat. No. 4,783,026. As should be apparent to those skilled in the art, the heat transfer structure of the present invention can be of various, preferably commercially-available designs, as long as the heat transfer structure is such that the heat transfer fluid can transfer thermal energy directly to the exposed portions of the aircraft to be de-iced.

Figure 4:
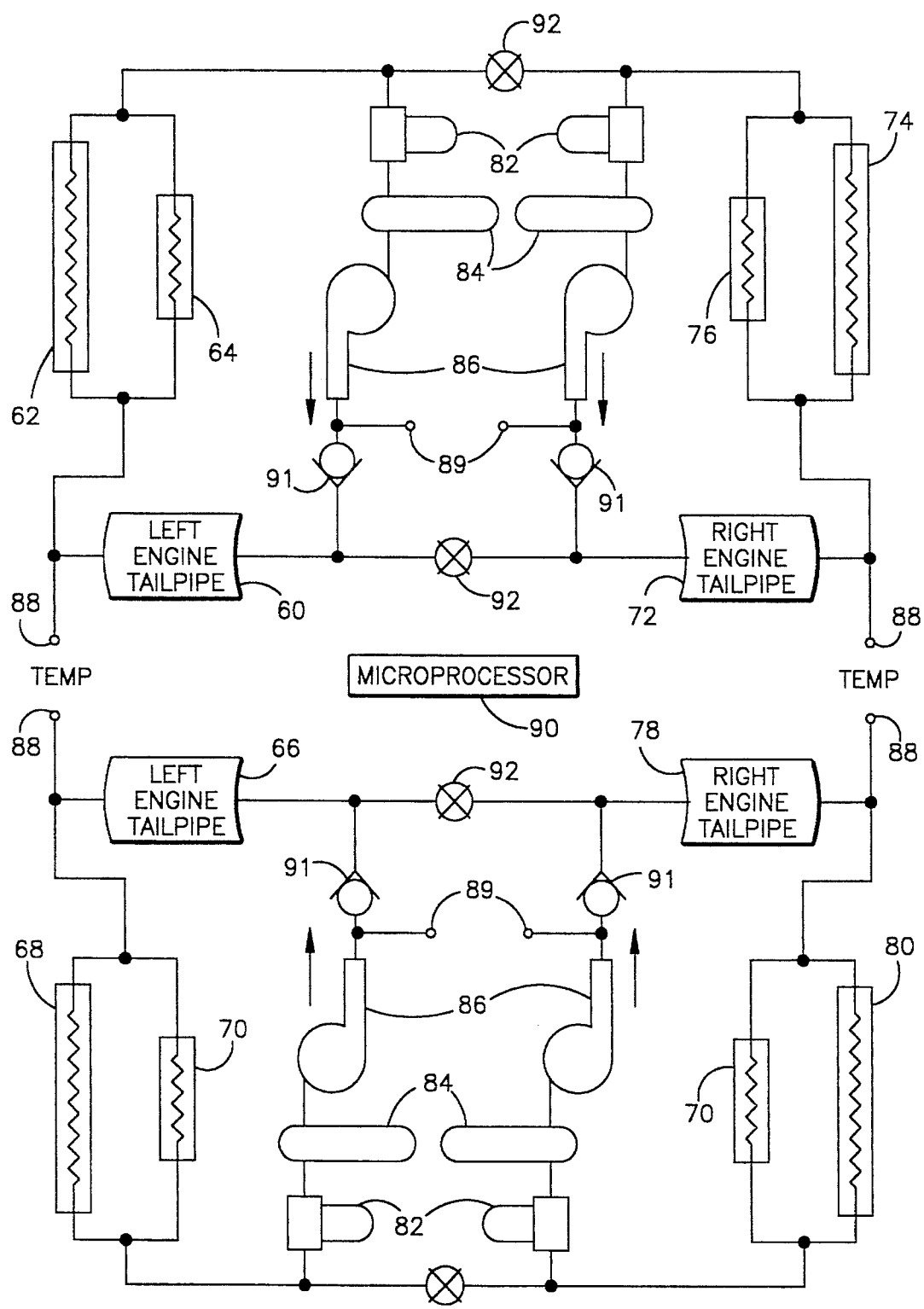
FIG. 4 is a schematic of the flow control system of the present invention.

An illustration of the heat exchange system is depicted in FIG. 4. For exemplary purposes, a pair of heat exchangers are illustrated as being mounted within both the right and left turbine engine tailpipes. However, as indicated previously, the number and location of the heat exchangers (and heat transfer structure) can vary depending upon the particular heat transfer requirements of the aircraft. In any case, the heat exchangers and heat transfer structure are fluidly interconnected within the system by a series of fluid conduits, i.e., high pressure and temperature pipes and/or hoses. For example, one left engine tailpipe heat exchanger 60 can be fluidly interconnected (in parallel) with both the left wing 62 and the left nacelle 64, while another left engine tailpipe heat exchanger 66 can be fluidly interconnected (in parallel) with the left elevator 68 and the rudder 70. Further, one right engine tailpipe heat exchanger 72 is fluidly interconnected (in parallel) with both the right wing 74 and the right nacelle 76, while another right tailpipe heat exchanger 78 can be fluidly interconnected (in parallel) with both the right elevator 80 and the rudder 70. As illustrated, the fluid inlet and outlet conduits are preferably connected at opposite ends of each heat exchanger using conventional high pressure fluid connectors. The above-described connections can, of course, be modified depending upon the heat transfer requirements and the structure of the aircraft.

The heated fluid from the heat exchanger(s) passes through the heat transfer structure in the exposed portion of the aircraft, and through filter, accumulator and pump systems. Each fluid, accumulator and pump system includes a fluid filter 82 which filters out impurities in the heat transfer fluid; an accumulator 84 which stores excess fluid depending upon the temperature and density characteristics of the fluid, and a pump 86 which maintains the fluid pressure within the system. The filter, accumulator and pump are preferably conventional, commercially-available components manufactured by a number of different sources, including the assignee of the present invention. It is preferred that the filter is a 50 micron filter; that the pump is a 270 VDC variable speed centrifugal pump; and that each accumulator is preferably a Metal Bellows accumulator available from the assignee of the present invention.

Appropriate temperature sensors 88 and pressure sensors 89 are located at selected locations within the system to sense system operativeness and efficiency, and provide output information for display in the cockpit and for input to a microprocessor 90 for control of the pumps 86 and other components of the system. Further, one-way check valves 91 and normally-closed isolation valves 92 provide proper flow direction of the heat transfer fluid through the heat exchangers to the heat transfer structure, and back to the heat exchangers. Moreover, in the case of the failure of one engine in a multiple-engine aircraft, isolation valves 92 can be opened to provide fluid flow through the entire system from the heat exchangers on the remaining engine(s) to temporarily maintain ice reduction and prevention. The temperature and pressure sensors, check valves and isolation valves are also preferably conventional, commercially-available components, manufactured by a number of different sources. While the system described above for providing fluid flow is relatively simple in nature (which lends itself to easy maintenance and repair), the system has an inherent redundancy which maintains effective ice removal and prevention in the event of engine failure.

When the aircraft is in need of deicing, the pumps 86 can be activated to move heat transfer fluid through the heat exchangers 60, 66, 72, 78. The heat transfer fluid absorbs heat energy from the exhaust gas in the tailpipe 20 and transfers the heat energy to the heat transfer structure 68, 62, 64, 70, 74, 76, 80 at the appropriate exposed portions of the aircraft. The heat transfer fluid loses some heat energy to the cooler air through the fins 44 on the outer plate 43 of the heat exchanger 10, however, because of the movement of the heat transfer fluid through the system and the relative dimensions and heat transfer capability of the fins on the inner plate as compared to the outer plate, this amount of heat loss does not degrade the de-icing performance of the system according to this invention. The heat transfer fluid then flows from the heat transfer structure back through the heat exchangers to again absorb heat energy from the exhaust gas.

Preferably the heat transfer fluid is heated to at least 400° F. as it exits the heat exchanger, and cools to about 100° F. as it exits the heat transfer structure of the surface to be de-iced on its way back to the heat exchanger. Further, the pressure within the system is preferably maintained between about 34 and 50 psia, and the flow rate is maintained at about 83 lbs/min. The pump flow rate can be adjusted to maintain these approximate pressures, temperatures and flow rates. Such a system has been found to effectively melt a 0.100 inch thick layer of ice on a 123 inch diameter engine cowl over a length of 40 inches (20 inches per side), assuming an gas exhaust of 1000° F., at 8.66 psia and 89.5 lbs/min.

While the turbine exhaust gases are somewhat cooled as the heat transfer fluid absorbs heat energy in the tailpipe, this cooling does not negatively impact the thrust of the engine. Further, while the engines are periodically forced to drive the pumps, it is, believed that the efficiency of the engines is not reduced to the extent as the previous techniques which use, for example, the bleed air from the compressors of the engines. In essence, the present invention relies more on using the waste heat from the turbine engines rather than in robbing the engine of thrust, as in other techniques.

When the aircraft is no longer in need of deicing, the pumps are deactivated to reduce the burden on the engines, thus conserving fuel. The stagnant heat transfer fluid in the heat exchangers is kept at an acceptable temperature below the boiling or evaporation point of the liquid by virtue of the fins on the outer plate transferring excess heat energy to the cooler air stream flowing around the engine core. The fins on the outer plate therefore in effect act as a heat regulator for the heat exchange system.

Accordingly, as described above, the present invention provides a simple, yet effective system and apparatus for removing and preventing ice-build up on an aircraft. The system and apparatus according to the invention is efficient and does not significantly tax or burden the engines.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. An exhaust gas heat exchanger for the turbine engine tailpipe of an aircraft, comprising:

i) an inner plate having heat exchange fins extending away from an outer surface of the inner plate, said heat exchange fins forming channels to direct an exhaust gas stream from the turbine engine across the outer surface of the inner plate and enable heat transfer therewith, said inner plate being formed of a material which can withstand degradation by the exhaust gas from the turbine engine;

ii) an outer plate having heat exchange fins extending away from an outer surface of the outer plate, said heat exchange fins on the outer plate forming channels to direct a cooler airflow passing through the turbine engine across the outer surface of the outer plate and enable heat exchange therewith, said inner and outer plates defining a plenum therebetween; and iii) heat transfer fluid disposed within the plenum formed between the inner plate and the outer plate, said heat transfer fluid being in heat exchange relationship with an inner surface of the inner plate and an inner surface of the outer plate such that heat energy can be transferred between the plates.

2. An exhaust gas heat exchanger for the turbine engine tailpipe of an aircraft, comprising:

(i) an inner plate having heat exchange fins extending away from an outer surface of the inner plate, said heat exchange fins forming channels to direct an exhaust gas stream from the turbine engine across the outer surface of the inner plate and enable heat transfer therewith, said inner plate being formed of a material which can withstand degradation by the exhaust gas from the turbine engine;

(ii) an outer plate having heat exchange fins extending away from an outer surface of the outer plate, said heat exchange fins on the outer plate forming channels to direct a cooler air flow passing through the turbine engine across the outer surface of the outer plate and enable heat exchange therewith, said inner and outer plates defining a plenum therebetween, and said heat exchange fins on said inner plate extending radially outward a greater extent than the heat exchange fins on the outer plate; and (iii) heat transfer fluid disposed within the plenum formed between the inner plate and the outer plate, said heat transfer fluid being in heat exchange relationship with an inner surface of the inner plate and an inner surface of the outer plate such that energy can be transferred between the plates.

3. The exhaust gas heat exchanger as in claim 2, wherein said heat exchange fins on the inner plate are equally spaced apart from each other and extend generally in the same direction, and said heat exchange fins on the outer plate are also spaced apart from each other and extend generally in the same direction.

4. The exhaust gas heat exchanger as in claim 3, wherein the exhaust gas heat exchanger is designed to be mounted within an opening formed in the engine tailpipe such that said fins on said inner plate extend generally in the direction of exhaust gas flow in the turbine engine and direct exhaust gas from the turbine engine through the tailpipe, and said heat exchange fins on said outer plate extend generally in the direction of cooler air flow passing through the turbine engine and direct the cooler air flow through the engine, and said inner and outer plates conform generally to the configuration of said turbine engine tailpipe.

5. The exhaust gas heat exchanger as in claim 4, wherein said heat transfer fluid comprises an incompressible fluid.

6. A turbine engine exhaust gas heat exchanger, comprising: a receptacle integral with a tailpipe of the turbine engine, said receptacle including:

i) an inner plate in direct heat exchange relationship with exhaust gas in the turbine engine tailpipe, said inner plate having heat exchange members extending inwardly into the tailpipe which direct exhaust gases across the inner plate and allow direct heat exchange therewith;

ii) an outer plate in heat exchange relationship with a cooler airflow stream passing through the turbine engine, said outer plate having heat exchange members extending outwardly away from the tailpipe which direct the cooler air across the outer plate of the heat exchanger and allow direct heat exchange therewith, said inner and outer plates defining a plenum therebetween; and iii) heat transfer fluid disposed within the plenum formed by the inner plate and the outer plate of the heat exchanger, said heat transfer fluid being in heat exchange relationship with the inner plate and the outer plate such that heat energy is transferred between the exhaust gas in the turbine engine tailpipe and the heat transfer fluid, and between the heat transfer fluid and the cooler air flow through the turbine engine.

7. The exhaust gas heat exchanger as in claim 6, wherein said receptacle is mounted within an aperture formed in the tailpipe.

8. The exhaust gas heat exchanger as in claim 7, wherein said heat exchange members on said inner plate and said outer plate comprise fins formed in one piece with a respective plate and extending radially away from the plate.

9. The exhaust gas heat exchanger as in claim 8, wherein said fins on said inner plate extend generally in the direction of exhaust gas flow through the turbine engine, and said fins on said outer plate extend generally in the direction of the cooler air flow stream through the turbine engine.

10. A heat exchange system for an aircraft comprising:

at least one heat exchanger integral with a tailpipe of a turbine engine on the aircraft, each heat exchanger including a first surface facing inwardly into the tailpipe and in contact with exhaust gas in the tailpipe to absorb heat therefrom, and a second surface facing outwardly from the tailpipe and in contact with a cooler air flow stream passing through the turbine engine to transfer excess heat thereto, and heat transfer fluid interposed within each heat exchanger in heat transfer relationship with both the inner surface and outer surface;

a filter for filtering the heat transfer fluid, an accumulator for storing excess heat transfer fluid, and a pump for maintaining a predetermined fluid pressure within the system;

heat transfer structure integral with exposed portions of the aircraft which directs heat transfer fluid through the exposed portions of the aircraft and transfers heat energy between the heat transfer fluid and the exposed portions of the aircraft; and fluid conduits fluidly interconnecting said heat exchanger, filter, accumulator, pump, and heat transfer structure.

11. The heat exchange system as in claim 10, wherein each heat exchanger is mounted within an aperture in the turbine engine tailpipe.

12. The heat exchange system as in claim 11, wherein each heat exchanger includes an inner plate with a surface in contact with engine exhaust gas in the tailpipe, and an outer plate with a surface in contact with the cooler air flow through the turbine engine, and said heat transfer fluid flows between and is in heat transfer relationship with both of said inner and outer plates.

13. The heat exchange system as in claim 12, wherein said inner and outer plates each include heat exchange fins extending radially away from the respective plate, said heat exchange fins on said inner plate extending inwardly into the exhaust tailpipe, and said heat exchange fins on said outer plate extending outward away from said exhaust tailpipe.

14. The heat exchange system as in claim 13, wherein each heat exchanger, the filter, accumulator and pump system, the heat transfer structure, and the fluid conduits define a closed fluid system.

15. The heat exchange system as in claim 14, wherein said heat transfer fluid comprises an incompressible fluid.

16. The heat exchange system as in claim 15 wherein the heat exchange fins on the first surface are in direct contact with the exhaust gas in the tailpipe, and the heat exchange fins on the second surface are in direct contact with the cooler air flow stream passing through the turbine engine.

17. The heat exchange system as in claim 10, further including a pair of turbine engines on the aircraft, each of which have a pair of heat exchangers integral with the tailpipe of a respective turbine engine, and further including valves for regulating and directing the flow of heat transfer fluid between the heat exchangers.

18. A turbine engine comprising an exhaust gas tailpipe receiving and exhausting heated combusted gases, an annular cowl section disposed radially outward of said tailpipe, a cool air flow path radially inward of said cowl and radially outward of said exhaust gas conduit, and an exhaust gas heat exchanger, said exhaust gas heat exchanger being mounted within an aperture in said cowl section and including an inner heat exchange plate having a first surface in direct contact with and in heat exchange relation to the combusted gases in said exhaust gas tailpipe and a second heat exchange surface radially outward of said first surface, an outer heat exchange plate having a first heat exchange surface in heat exchange relation to air in the cool air flow path and a second heat exchange surface radially inward of said first heat exchange surface, and said second heat exchange surfaces cooperatively defining a sealed plenum; and heat transfer fluid disposed in the plenum to transfer heat energy between the inner and outer heat exchange plates.

19. The exhaust gas heat exchanger as in claim 1, wherein said heat transfer fluid comprises an incompressible fluid.

20. The exhaust gas heat exchanger as in claim 6, wherein said heat transfer fluid comprises an incompressible fluid.

21. The exhaust gas heat exchanger as in claim 6, wherein said heat exchange members on said inner plate extend outward from the inner plate a greater extent than the heat exchange members on the outer plate.

22. The turbine engine as in claim 18, wherein said heat transfer fluid comprises an incompressible fluid.

23. The turbine engine as in claim 18, wherein said inner plate has heat exchange members extending away from said first heat exchange surface on said inner plate and radially inward into said cowl section, and said outer plate also has heat exchange members extending away from first heat exchange surface on said outer plate.

24. The turbine engine as in claim 23 wherein said heat exchange members on said inner plate extend outwardly from the said inner plate a greater extent than the heat exchange members on said outer plate.

* * * * *